US010038462B2

(12) United States Patent
Gomaa et al.

(10) Patent No.: US 10,038,462 B2
(45) Date of Patent: Jul. 31, 2018

(54) DIGITAL CANCELLATION OF RECEIVER NONLINEAR DISTORTION IN CARRIER AGGREGATION SYSTEMS

(71) Applicant: MEDIATEK INC., Hsinchu (TW)

(72) Inventors: Ahmad Gomaa, Qalyubia (EG);
Charles Chien, Newbury Park, CA (US); Ming Lei, San Jose, CA (US);
Chih-Yuan Lin, Yilan County (TW);
Chun-Ying Ma, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/591,901

(22) Filed: May 10, 2017

(65) Prior Publication Data

US 2017/0331502 A1    Nov. 16, 2017

Related U.S. Application Data

(60) Provisional application No. 62/335,865, filed on May 13, 2016.

(51) Int. Cl.
*H04K 1/02* (2006.01)
*H04B 1/04* (2006.01)
(Continued)

(52) U.S. Cl.
CPC ......... *H04B 1/0475* (2013.01); *H04B 1/1081* (2013.01); *H04L 25/0242* (2013.01)

(58) Field of Classification Search
CPC .. H04B 1/0475; H04B 1/1081; H04L 25/0242
(Continued)

(56) References Cited

U.S. PATENT DOCUMENTS

| 7,876,867 B2 | 1/2011 | Filipovic et al. ............ 375/346 |
| 2008/0039045 A1* | 2/2008 | Filipovic ................ H04B 1/109 455/295 |

(Continued)

OTHER PUBLICATIONS

Geoffrey Davis et al., Adaptive time-frequency decompositions, Optical Engineering 33(7), 2183-2191 (Jul. 1994).

(Continued)

*Primary Examiner* — Leila Malek
(74) *Attorney, Agent, or Firm* — Imperium Patent Works; Zheng Jin (57) ABSTRACT

A method of sparse digital cancellation of receiver nonlinear distortion in carrier aggregation systems is proposed. A reference signal generator generates possible candidate reference signals to be included in a dictionary matrix D. A sparsity-based solution is then applied to dynamically select reference signals based on the RF transceiver configuration. Based on the auto-correlation and cross-correlation with an observed radio signal, a subset of reference signals is selected from the dictionary matrix to match the distortion signal. The number of selected reference signals is flexibly determined based on the design constraints on complexity and power consumption. A greedy sparse estimation approaches, e.g., Orthogonal Matching Pursuit (OMP) can be used for reference signal selection. The reference signal selection is dynamic and adapts itself for different channel responses through correlating the observed radio signal with the dictionary reference signals.

20 Claims, 5 Drawing Sheets

(51) Int. Cl.
*H04B 1/10* (2006.01)
*H04L 25/02* (2006.01)

(58) Field of Classification Search
USPC .............. 375/296, 346; 455/296, 114.3, 63.1
See application file for complete search history.

(56) References Cited

U.S. PATENT DOCUMENTS

2009/0086863 A1* 4/2009 Komninakis ............ H04B 1/10
                                                          375/346
2009/0086864 A1* 4/2009 Komninakis ............ H04B 1/10
                                                          375/346
2013/0286903 A1  10/2013 Khojastepour et al. ...... 370/280

OTHER PUBLICATIONS

Hayg-Taniel Dabag et al., All-Digital Cancellation Technique to Mitigate Receiver Desensitization in Uplink Carrier Aggregation in Cellular Handsets, IEEE Transactions on Microwave Theory and Techniques, vol. 61, No. 12, Dec. 2013.
M. Omer et al., All Digital Compensation Scheme for Spur Induced Transmit Self-Jamming in Multi-Receiver RF Frond-Ends, 978-14673-1088-8/12/$31.00 © 2012 IEEE.

* cited by examiner

FIG. 1

$$IMD(n) = \left(\sum_{k_1=0}^{L_1-1} h_1(k_1)s_1(n-k_1)\right)^p \left(\sum_{k_2=0}^{L_2-1} h_2(k_2)s_2(n-k_2)\right)^q$$

DIGITAL CANCELLATION OF RECEIVER NONLINEAR DISTORTION IN CARRIER AGGREGATION SYSTEMS

CROSS REFERENCE TO RELATED APPLICATIONS

This application claims priority under 35 U.S.C. § 119 from U.S. Provisional Application No. 62/335,865, entitled "Digital Cancellation of Receiver Nonlinear Distortion in Carrier Aggregation Systems," filed on May 13, 2016, the subject matter of which is incorporated herein by reference.

TECHNICAL FIELD

The disclosed embodiments relate generally to interference cancellation, and, more particularly, to digital cancellation of receiver nonlinear distortion in carrier aggregation systems.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

Enhancements to LTE systems are considered so that they can meet International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA) is introduced to improve the system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the CCs.

To support carrier aggregation, multiple radio frequency (RF) chains are required. Due to poor antenna or front-end isolation in the UE, a first radio signal transmitted by a first RF transceiver or its distorted version will be received by a second RF transceiver and vice versa. This mechanism of TX signal reciprocal mixing with a spur in the RX path is referred to as self-interference or TX self-jamming. If all system components were perfectly linear, the coupled version of the first radio signal would only act as an out-of-band jammer. However, nonlinear behavior of the RF receiver creates inter-modulation distortion (IMD) products that can land in the receiver band.

Digital cancellation of self-interference generated by RX nonlinearity requires estimation of several reference signals contributions. However, the number of reference signals significantly increases as nonlinearity order and front-end component frequency selectivity increase. As a result, the estimation of the reference signals contributions becomes more complex. Various methods of digital interference cancellation via a reference path have been proposed. The reference path, however, is fixed and cannot adapt to different RF configurations. An improve method of digital cancellation of self-interference generated by RX nonlinearity is sought to reduce computation complexity and to improve cancellation performance.

SUMMARY

A method of sparse digital cancellation of receiver nonlinear distortion in carrier aggregation systems is proposed. A reference signal generator generates possible candidate reference signals to be included in a dictionary matrix D. A sparsity-based solution is then applied to dynamically select reference signals based on the RF transceiver configuration. Based on the auto-correlation and cross-correlation with an observed radio signal, a subset of reference signals is selected from the dictionary matrix to match the distortion signal. The number of selected reference signals is flexibly determined based on the design constraints on complexity and power consumption. A greedy sparse estimation approaches, e.g., Orthogonal Matching Pursuit (OMP) can be used for reference signal selection. The reference signal selection is dynamic and adapts itself for different channel responses through correlating the observed radio signal with the dictionary reference signals.

In one embodiment, one or more radio frequency (RF) transmitters of a UE transmit one or more radio signals processed from one or more digital signals. A signal generator generates a dictionary matrix comprising possible candidate reference signals from the one or more digital signals. An RF receiver of the UE observes a received radio signal, the received radio signal comprises a distortion signal contributed from the one or more radio signals. A sparsity-based signal selector selects a subset of reference signals having corresponding sparse weighting vectors to match the distortion signal from the dictionary matrix based on the observed received radio signal. The UE cancels or pre-distorts the distortion signal from the received radio signal based on the selected subset of reference signals and the corresponding sparse weighting vectors.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
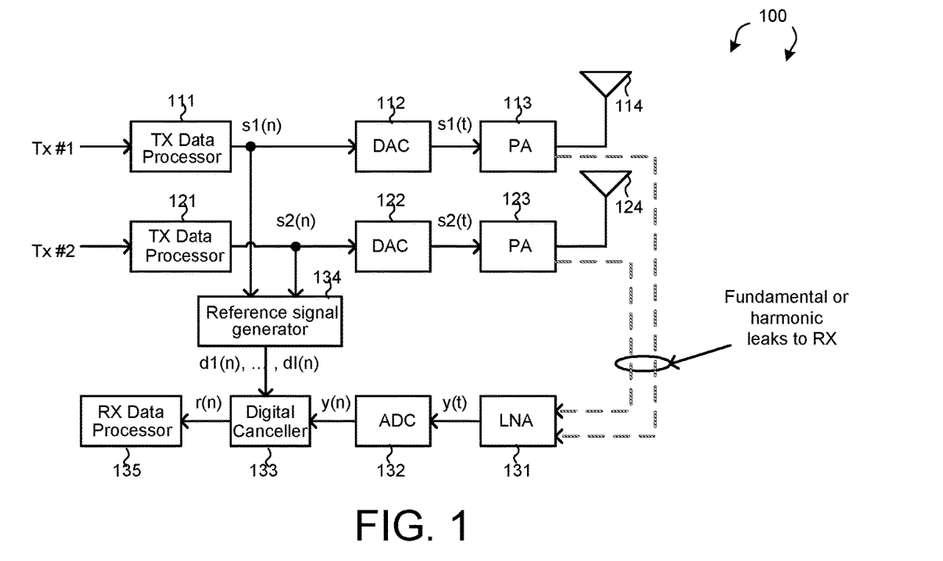
FIG. 1 illustrates a simplified block diagram of a user equipment (UE) with digital cancellation of self-interference in accordance with one novel aspect.

FIG. 1 illustrates a simplified block diagram of a user equipment (UE) 100 with digital cancellation of self-interference in accordance with one novel aspect. UE 100 comprises multiple radio frequency (RF) chains to support carrier aggregation (CA). In the example of FIG. 1, UE 100 comprises a first RF transmitter (TX #1), which comprises a TX data processor 111, a digital to analog converter (DAC) 112, a power amplifier (PA) 113, and an antenna 114. Similarly, UE 100 comprises a second RF transmitter (TX #2), which comprises a TX data processor 121, a digital to analog converter (DAC) 122, a power amplifier (PA) 123, and an antenna 124. TX data processor 111 outputs a first digital signal s1($n$), which is converted to a time domain analog signal s1($t$) by DAC 112, up-converted by a mixer to radio frequency, and then amplified by PA 113 to be transmitted out as a first radio signal via antenna 114. Similarly, TX data processor 121 outputs a second digital signal S2($n$), which is converted to a time domain analog signal S2($t$) by DAC 122, up-converted by a mixer to radio frequency, and then amplified by PA 123 to be transmitted out as a second radio signal via antenna 124.

At the receiver side, UE 100 comprises one or more RF receivers. As depicted in FIG. 1, the RF receiver comprises a low noise amplifier (LNA) 131, an analog to digital converter (ADC) 132, a digital canceller 133, a reference signal generator 134, and an RX data processor 135. Due to poor antenna or front-end isolation in the UE, the first radio signal transmitted by the first RF transceiver or its distorted version will be received by a second RF transceiver and vice versa. This mechanism of TX signal reciprocal mixing with a spur in the RX path is referred to as self-interference or TX self-jamming. If all system components were perfectly linear, the coupled version of the first/second radio signal would only act as an out-of-band jammer. However, non-linear behavior of the RF receiver (e.g., LNA 131) creates inter-modulation distortion (IMD) products that can land in the receiver band.

In the example of FIG. 1, nonlinear LNA 131 observes a received radio signal that includes a desired radio signal as well as an interfering or distortion radio signal contributed by the TX radio signals from its own RF transmitters. The interfering radio signal comes from the fundamental or harmonic leaks from the TX radio signals to the RX. Note that FIG. 1 simply illustrates one example with two TX processors. The invention is not limited to two TX processors. The interfering radio signal can come from one TX generating an interfering signal that is filtered and then hit the non-linearity at the receiver. Additionally, the interfering signal can come from a plurality of more than two TX processors. LNA 131 outputs an observed analog radio signal y(t) in time domain, a mixer (not shown) down-converts the analog radio signal y(t) to a frequency band that ADC 132 operates in (e.g. baseband), and ADC 132 converts y(t) to a digital signal y(n). The digital canceller 133 cancels or reduces the contribution of the interfering signal from the observed radio signal y(n) and outputs a desired digital signal r(n). Finally, RX data processor 135 process the desired digital signal r(n) accordingly.

Digital cancellation of self-interference generated by RX nonlinearity requires estimation of several reference signals contributions. However, the number of reference signals significantly increases as nonlinearity order and front-end component frequency selectivity increase. As a result, the estimation of the reference signals contributions becomes more complex. In accordance with one novel aspect, the reference signal generator 134 first generates possible candidate reference signals to be included in a dictionary matrix D. A sparsity-based solution is then applied to dynamically select reference signals based on the RF transceiver configuration. Based on the auto-correlation and cross-correlation with the observed radio signal, a subset of reference signals is selected from the dictionary matrix to match the distortion signal. The number of selected reference signals is flexibly determined based on the design constraints on complexity and power consumption. Any of the greedy sparse estimation approaches, e.g., Orthogonal Matching Pursuit (OMP) can be used for reference signal selection. The reference signal selection is dynamic and adapts itself for different channel responses through correlating the observed radio signal with the dictionary reference signals.

Figure 2:
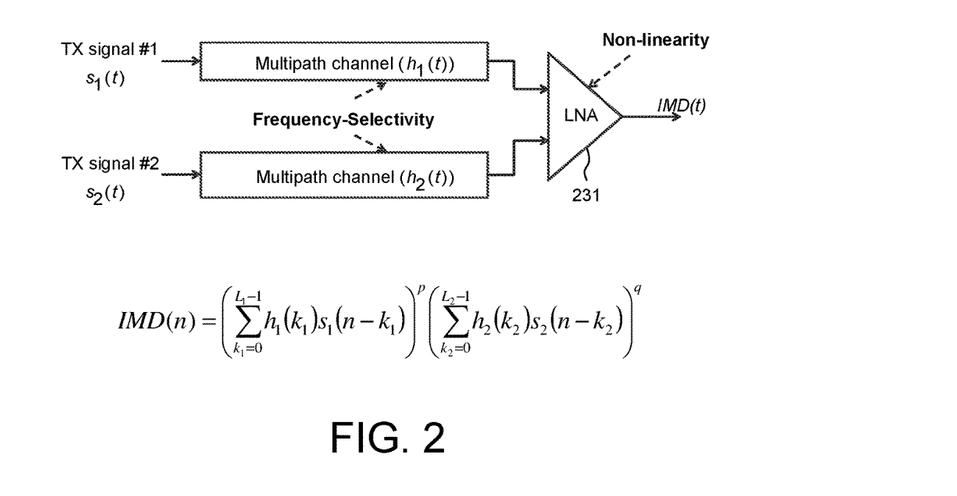
FIG. 2 illustrates the nonlinearity generation by multiple RF transceivers in a mobile communication system supporting carrier aggregation.

FIG. 2 illustrates the nonlinearity generation by multiple RF transceivers in a mobile communication system supporting carrier aggregation. To support carrier aggregation, multiple radio frequency (RF) chains are required. As depicted in FIG. 2, a first TX signal $s_1(t)$ and a second TX signal $s_2(t)$ from two RF transmitters are received by LNA 231 at the receiver side over different multipath channels h1($t$) and h2($t$) respectively. The self-interference or TX self-jamming is caused by the frequency-selectivity of the multipath channels and the subsequent non-linearity of the LNA. As a result, an inter-modulation distortion signal IMD(t) is introduced to the receiver side. In general, the digitized IMD signal IMD(n) can be represented by the following:

$$IMD(n) = \left(\sum_{k_1=0}^{L_1-1} h_1(k_1)s_1(n-k_1)\right)^p \left(\sum_{k_2=0}^{L_2-1} h_2(k_2)s_2(n-k_2)\right)^q \quad (1)$$

Where
s1 and s2 represent the transmitted signals
h1 and h2 represent the channel response matrixes of the multipath channels over which s1 and s2 are transmitted
$L_1$ and $L_2$ represent the channel memory (unit: sample)
p and q represent the nonlinearity orders
Take a simple example: for $L_1=L_2=2$, p=1, and q=1, the IMD(n) has 4 terms, i.e., 4 reference signals.

$$IMD(n) = \left(\sum_{k_1=0}^{1} h_1(k_1)s_1(n-k_1)\right)\left(\sum_{k_2=0}^{1} h_2(k_2)s_2(n-k_2)\right)$$

However, for $L_1=L_2=3$, p=2, and q=1, the IMD(n) has 18 terms, i.e., 18 reference signals. The increased number of possible candidate reference signals makes the estimation of the reference signal contribution more complex. Therefore, it is desirable to select and reduce the number of reference signals. In addition, it is desirable to select and reduce the number of reference signals dynamically based on the different channel responses and the RF configurations. In general, $$IMD(n) = \sum_{i=1}^{I} v_i d_i(n)$$

$$[IMD(0) \ldots IMD(N-1)]^T = Dv$$

Figure 3:
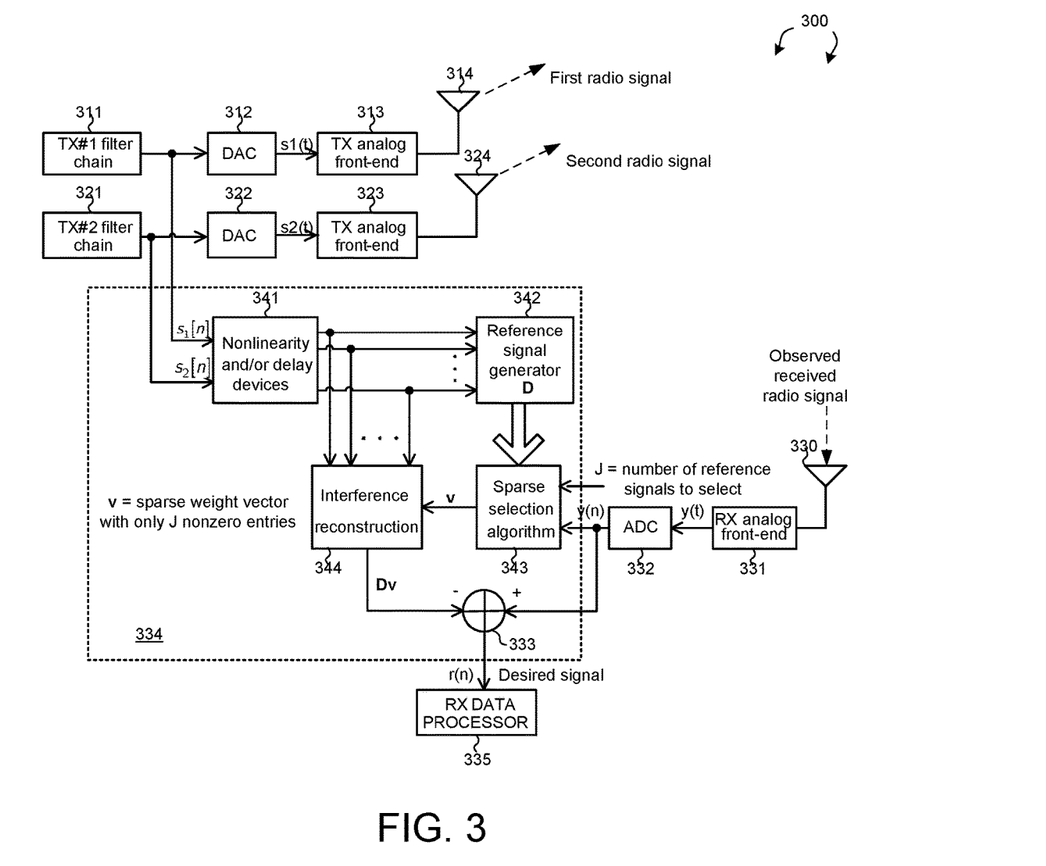
FIG. 3 illustrates a more detailed block diagram of an RF transceiver with digital cancellation of self-interference adopting a sparsity-based solution to dynamically select reference signals.

Where
$D \triangleq [d_1 \ldots d_I]$ represents the dictionary of possible reference signals
$d_i \triangleq [d_i(0) \ldots d_i(N-1)]^T$ represents each of the candidate reference signal
$v \triangleq [v_1 \ldots v_I]^T$ represents the weigh vectors for the reference signals FIG. 3 illustrates a more detailed block diagram of an RF transceiver 300 with digital cancellation of self-interference adopting a sparsity-based solution to dynamically select reference signals. RF transceiver 300 comprises a first RF transmitter, which comprises a TX#1 filter chain 311, a digital to analog converter (DAC) 312, a TX analog front-end 313, and an antenna 314. Similarly, RF transceiver 300 comprises a second RF transmitter, which comprises a TX#2 filter chain 321, a digital to analog converter (DAC) 322, a TX analog front-end 323, and an antenna 324. TX#1 filter chain 311 outputs a first digital signal s1(n), which is converted to a time domain analog signal s1(t) by DAC 312, and then processed by TX analog front-end 313 to be transmitted out as a first radio signal via antenna 314. Similarly, TX#2 filter chain 321 outputs a second digital signal s2(n), which is converted to a time domain analog signal s2(t) by DAC 322, and then processed by TX analog front-end 323 to be transmitted out as a second radio signal via antenna 324.

At the receiver side, RF transceiver 300 comprises one or more RF receivers. As depicted in FIG. 3, the RF receiver comprises an antenna 330, an RX analog front-end 331, an analog to digital converter (ADC) 332, a digital interference canceller 334, and an RX data processor 335. Antenna 330 observes a received radio signal that includes a desired radio signal as well as an interfering or distortion radio signal contributed by the TX radio signals from its own RF transmitters. The interfering radio signal comes from the fundamental or harmonic leaks from the TX radio signals to the RX. RX analog front-end 331 outputs an observed analog radio signal y(t) in time domain, ADC 332 converts y(t) to a digital signal y(n). The digital interference canceller 334 cancels or reduces the contribution of the interfering signal from the observed radio signal y(n) and outputs a desired digital signal r(n). Finally, RX data processor 335 process the desired digital signal r(n) accordingly.

The digital interference canceller 334 further comprises nonlinearity and/or delay devices 341, a reference signal generator 342, a sparsity-based signal selector 343, an interference reconstruction circuit 344, and a digital adder 333. Based on the nonlinearity and/or delay devices existed in the RF transceiver, the reference signal generator 342 generates possible candidate reference signals from s1(n) and s2(n) and collect the possible candidate reference signals in a dictionary matrix D. The sparsity-based signal selector 343 takes the input of D, the number of reference signals (J) to be selected, and the observed signal y(n), then performs a sparse selection algorithm to select a subset of reference signals (J reference signals) from dictionary D, and outputs corresponding weight vector v. The interference reconstruction circuit 344 reconstructs the interference signal (Dv). Finally, the digital adder 333 subtracts the reconstructed interference signal Dv from the observed signal y(n) and outputs a desired signal r(n) to be processed by RX data processor 335.

Note that nonlinearity and/or delay devices 341 represents the nonlinearity in FIG. 2. Dictionary D is formed by the delays and inter-modulations of the nonlinearities. For different carrier aggregation combination, RF components used, and the RF transmission and reception techniques applied, the nonlinearity effect and channel memory effect might be different. The IMD formula itself is highly case-dependent. Based on the analysis for each specific case, the IMD formula, i.e., equation (1) can be established and the dictionary built based on this formula. In the atom selection process performed by the sparse selection algorithm 343, the contribution of each atom can be roughly obtained. Based on this results, the weak atoms can be ignored in the future to reduce complexity. In other words, a subset of reference signals (with a reduced number of J reference signals) are selected from dictionary D for interference reconstruction and cancellation. The reference signal selection depends on RF configuration. In one example, if there are multiple receivers like in carrier aggregation case with two downlink inter-band, then there may be different reference signals for each of the receiver if the interference mechanisms differ between the two receivers. In another example, the selection process should determine the best set of reference signals for each use case. Each use case could involve different RF configurations, e.g., two, three, . . . multiple downlink depending on the CA configuration.

Figure 4:
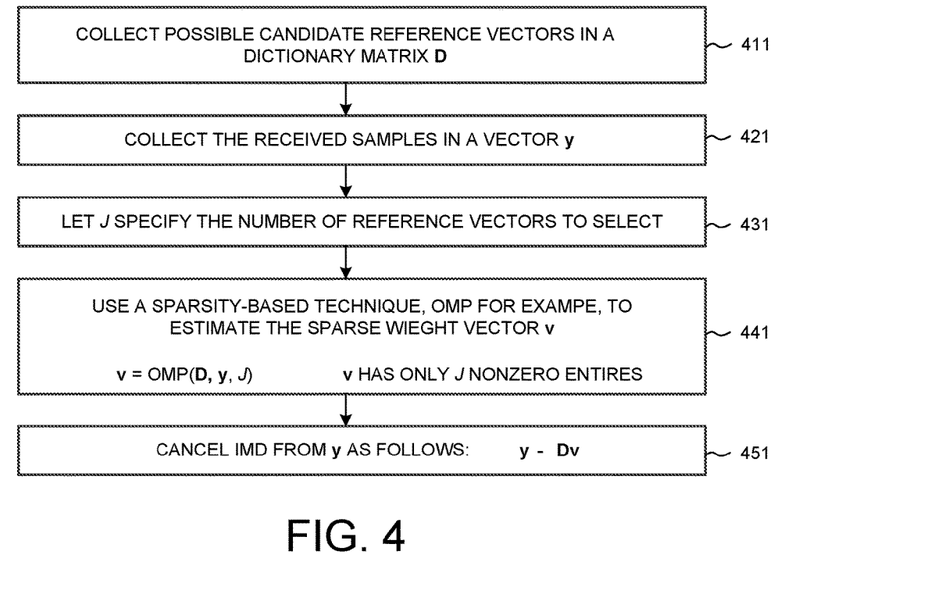
FIG. 4 illustrates a simplified flow chart of one embodiment of a sparsity-based digital cancellation of self-interference due to RX nonlinearity in accordance with one novel aspect.

FIG. 4 illustrates a simplified flow chart of one embodiment of a sparsity-based digital cancellation of self-interference due to RX nonlinearity in accordance with one novel aspect. In step 411, a digital interference canceller collects possible candidate reference signals (vectors) in a dictionary matrix D. The dictionary is dynamically reconfigurable to accurately estimate the actual IMD. In step 421, the digital interference canceller collects the received samples in a vector y. In step 431, let J specify the number of reference signals (vectors) to be selected. The number J is flexibly determined based on the design constraints on complexity and power consumption. In step 441, the digital interference canceller uses a sparsity-based technique, e.g., OMP, to estimate the sparse weight vector v. For example, v=OMP (D, y, J), and v has only J nonzero entries. In this step, the dictionary D is dynamically reduced to J selected reference signals, using the received samples y, e.g., the transmitted signal or its derivatives. In step 451, the digital interference canceller cancels IMD from y as follows: y–Dv.

Figure 5:
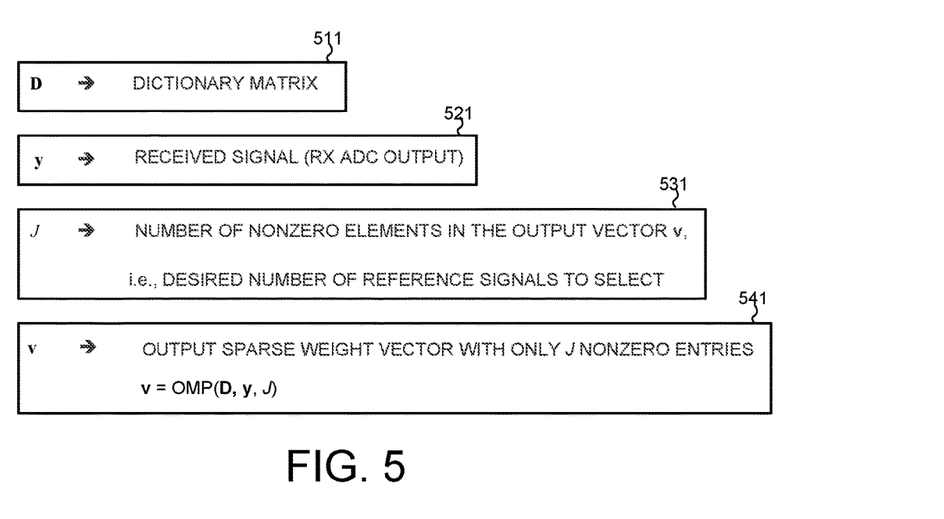
FIG. 5 illustrates a simplified flow chart of the orthogonal matching pursuit (OMP) algorithm used for sparsity-based reference signal selection.

FIG. 5 illustrates a simplified flow chart of the orthogonal matching pursuit (OMP) algorithm used for sparsity-based reference signal selection. OMP is a greedy algorithm, which computes a suboptimal expansion of a signal in a redundant dictionary of reference signals or vectors. The dictionary vectors that best match a signal's structures are chosen iteratively. In step 511, a dictionary matrix D of possible candidate reference signals is collected as input. In step 521, a received signal, e.g., the output signal y from RX ADC is collected as input. In step 531, the number of nonzero elements J in the output vector v is determined, i.e., J is the desired number of reference signals to be selected. In step 541, the sparse weight vector v with only J nonzero entries that best matches the distortion signal is estimated and outputted: v=OMP (D, y, J).

Figure 6:
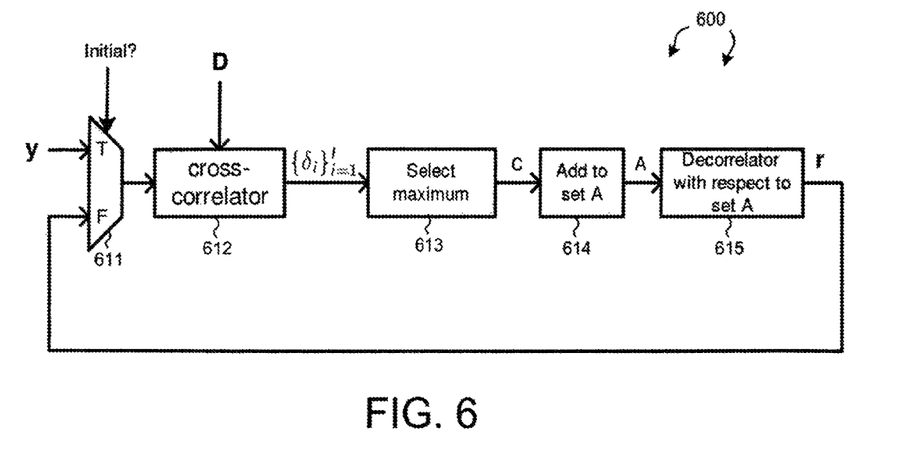
FIG. 6 illustrates a block diagram of a sparsity-based reference signal selector that uses the OMP algorithm for reference signal selection.

FIG. 6 illustrates a block diagram of a sparsity-based reference signal selection circuit 600 that uses the OMP algorithm for reference signal selection. In FIG. 6, the OMP reference signal selection circuit 600 comprises a multiplexer 611, a cross-correlator 612, a maximum selector 613, an adder 614, and a decorrelator 615. The multiplexer 611 outputs a signal selected from input signal y and feedback signal r. The outputted signal is then cross-correlated with dictionary matrix D by cross-correlator 612. The cross-correlation result is then used to compute a maximum by maximum selector 613. The selected maximum is then added to set A. Decorrelation is then performed with respect to set A by decorrelator 615. As a result, a corresponding weight vector v is computed, and an updated signal r is also computed and then feedbacked to multiplexer 611 for the next iteration. Upon all of the J nonzero entries of the weight vector v is computed, the OMP algorithm is completed.

Figure 7:
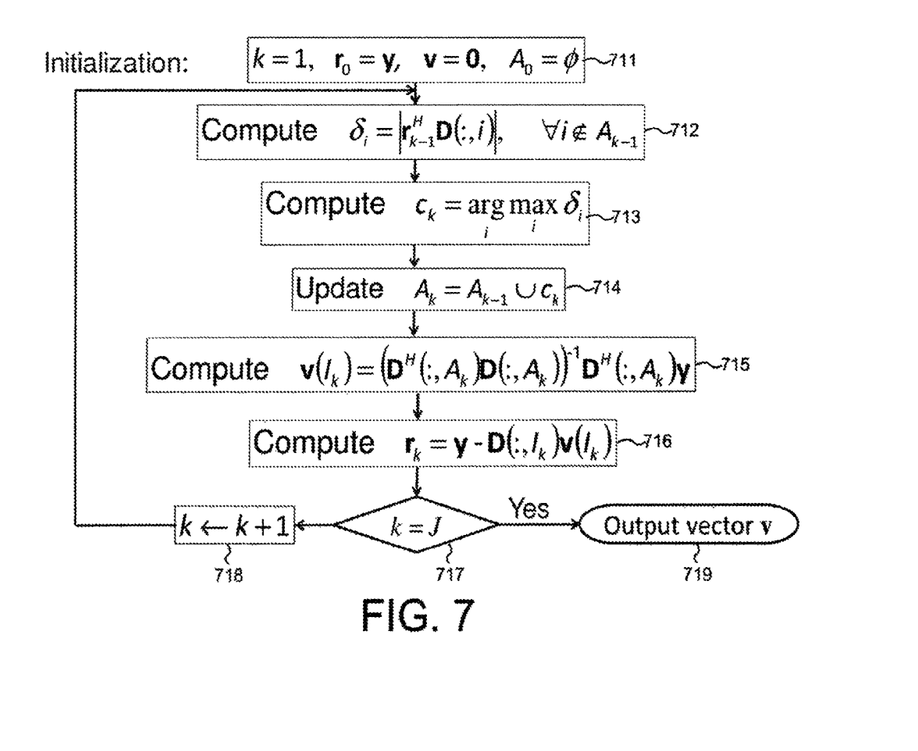
FIG. 7 illustrates a more detailed flow chart of the OMP algorithm used for reference signal selection with respect to the block diagram of FIG. 6.

FIG. 7 illustrates a more detailed flow chart of the OMP algorithm used for reference signal selection with respect to the block diagram of FIG. 6. In step 711, OMP circuit performs initialization for iteration index k=1, updated signal $r_0$=y, weigh vector v=0, and set A=Φ. In step 712, the OMP circuit performs cross-correlation between signal r and dictionary D (via cross-correlator 612). In step 713, the OMP circuit computes maximum $c_k$ (via maximum selector 613). In step 714, the OMP circuit updates set $A_k$ (via adder 614). In step 715, the OMP circuit computes weight vector v and in step 716 updates signal $r_k$ accordingly (via decorrelator 615). In step 717, the OMP circuit checks whether the iteration index k has reached number J. If the answer is no, then the iteration index k is incremented, and the updated signal $r_k$ is feedbacked to step 712 for the next iteration. If the answer is yes, then the OMP algorithm is completed and the resulted weight vector v is outputted.

Figure 8:
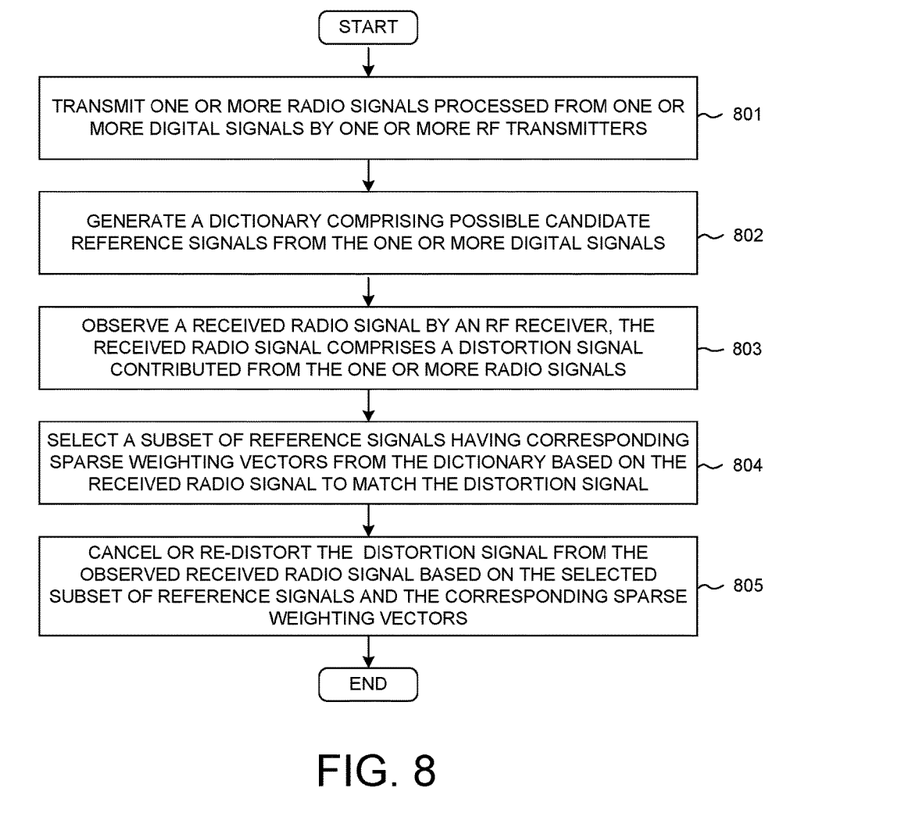
FIG. 8 is a flow chart of a method of sparsity-based digital interference cancellation in accordance with one novel aspect.

FIG. 8 is a flow chart of a method of sparsity-based digital interference cancellation in accordance with one novel aspect. In step 801, one or more radio frequency (RF) transmitters transmit one or more radio signals processed from one or more digital signals. In step 802, a signal generator generates a dictionary matrix comprising possible candidate reference signals from the one or more digital signals. In step 803, an RF receiver observes a received radio signal, the received radio signal comprises a distortion signal contributed from the one or more radio signals. In step 804, a signal selector selects a subset of reference signals having corresponding sparse weighting vectors from the dictionary matrix based on the received radio signal to match the distortion signal. In step 805, the UE cancels or pre-distorts the distortion signal from the observed received radio signal based on the selected subset of reference signals and the corresponding sparse weighting vectors.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A circuit for a user equipment (UE), comprising:
   one or more radio frequency transmitters that transmit one or more radio signals processed from one or more digital signals;
   a reference signal generator that generates a dictionary matrix of possible candidate reference signals from the one or more digital signals;
   an Radio Frequency (RF) receiver that observes a received radio signal that comprises a distortion signal contributed from the one or more radio signals;
   a sparsity-based selector that selects a subset of reference signals having corresponding weighting vectors from the dictionary matrix based on the received radio signal to match the distortion signal; and
   a digital interference canceller that cancels or pre-distorts the distortion signal from the observed received radio signal based on the selected subset of reference signals and the corresponding weighting vectors.

2. The circuit of claim 1, wherein the one or more digital signals are transmitted through multipath channels with frequency-selectivity.

3. The circuit of claim 1, wherein the RF receiver contains RF components with non-linearity and/or delay.

4. The circuit of claim 1, wherein the dictionary matrix comprises inter-modulation distortion (IMD) products resulted from frequency-selectivity and nonlinearity generation of the one or more digital signals.

5. The circuit of claim 4, wherein the dictionary matrix is dynamically reconfigurable based on the inter-modulation distortion (IMD) products.

6. The circuit of claim 1, wherein the dictionary matrix is dynamically reduced by the sparsity-based selector using a greedy algorithm.

7. The circuit of claim 1, wherein the dictionary matrix is dynamically reduced by the sparsity-based selector using an orthogonal matching pursuit (OMP) algorithm.

8. The circuit of claim 1, wherein the subset of reference signals is selected based on auto correlation of the dictionary matrix and cross correlation between the dictionary matrix and the received radio signal.

9. The circuit of claim 1, wherein the subset of reference signals comprises a reduced number of referenced signals, and wherein the reduced number is determined based on complexity and power consumption requirements.

10. The circuit of claim 1, wherein a first subset of reference signals is selected associated with a first RF receiver configuration, and wherein a second subset of reference signals is selected associated with a second RF receiver configuration.

11. A method, comprising:
    transmitting one or more radio signals processed from one or more digital signals by one or more radio frequency (RF) transmitters;
    generating a dictionary matrix comprising possible candidate reference signals from the one or more digital signals;
    observing a received radio signal by an Radio Frequency (RF) receiver, the received radio signal comprises a distortion signal contributed from the one or more radio signals;
    selecting a subset of reference signals having corresponding weighting vectors from the dictionary matrix based on the received radio signal to match the distortion signal; and
    cancelling or pre-distorting the distortion signal from the observed received radio signal based on the selected subset of reference signals and the corresponding weighting vectors.

12. The method of claim 11, wherein the one or more digital signals are transmitted through multipath channels with frequency-selectivity.

13. The method of claim 11, wherein the RF receiver contains RF components with non-linearity and/or delay.

14. The method of claim 11, wherein the dictionary comprises inter-modulation distortion (IMD) products resulted from frequency-selectivity and nonlinearity generation of the one or more digital signals.

15. The method of claim 14, wherein the dictionary matrix is dynamically reconfigurable based on the inter-modulation distortion (IMD) products.

16. The method of claim 11, wherein the dictionary matrix is dynamically reduced by the sparsity-based selector using a greedy algorithm.

17. The method of claim 11, wherein the dictionary matrix is dynamically reduced by a sparsity-based selector using an orthogonal matching pursuit (OMP) algorithm.

18. The method of claim 11, wherein the subset of reference signals is selected based on auto correlation of the dictionary matrix and cross correlation between the dictionary matrix and the received radio signal.

19. The method of claim 11, wherein the subset of reference signals comprises a reduced number of referenced signals, and wherein the reduced number is determined based on complexity and power consumption requirements.

20. The method of claim 11, wherein a first subset of reference signals is selected associated with a first RF receiver configuration, and wherein a second subset of reference signals is selected associated with a second RF receiver configuration.

* * * * *